United States Patent [19]

Comment

[11] Patent Number: 5,158,215
[45] Date of Patent: Oct. 27, 1992

[54] AUTOMATIC LIFT VALVE

[76] Inventor: Paul Comment, 275, route Cantonale, 2892 Courgenay, Switzerland

[21] Appl. No.: 691,027
[22] PCT Filed: Nov. 7, 1980
[86] PCT No.: PCT/CH90/00258
§ 371 Date: Jun. 25, 1991
§ 102(e) Date: Jun. 25, 1991
[87] PCT Pub. No.: WO91/07334
PCT Pub. Date: May 30, 1991

[30] Foreign Application Priority Data
Nov. 8, 1989 [CH] Switzerland ............ 4024/89

[51] Int. Cl.⁵ .................................. G05D 16/06
[52] U.S. Cl. ............................ 222/396; 222/399
[58] Field of Search ........... 222/396, 397, 399, 402.21, 222/559, 518; 137/171

[56] References Cited
U.S. PATENT DOCUMENTS
4,519,528 5/1985 Comment ................. 222/396

FOREIGN PATENT DOCUMENTS
332389 9/1989 European Pat. Off. .
2144520 3/1985 United Kingdom .
04163 7/1986 World Int. Prop. O. .......... 222/396

Primary Examiner—Andres Kashnikow
Assistant Examiner—Kenneth DeRosa
Attorney, Agent, or Firm—Kane, Dalsimer, Sullivan, Kurucz, Levy, Eisele and Richard

[57] ABSTRACT

The lift valve comprises a body (1) in which is formed a cylindrical chamber (2) provided with a lateral inlet (14) and with an outlet (3). This chamber contains a piston (4) on which acts a spring (22) and which is solidly fixed to a rod (6) whose end constitutes a valve seal. The rod (6) is further provided with a cross-section reducer (9) formed, for example, by a perforated cylindrical bearing surface. The inlet aperture (14) opens out between the piston (4) and the cross-section reducer (9). The difference between the forces acting on the piston and on the cross-section reducer causes the piston to retract, thus opening the lift valve. The cross-section reducer seals the inlet aperture (14) to a greater or lesser extent.

4 Claims, 3 Drawing Sheets

AUTOMATIC LIFT VALVE

FIELD OF THE INVENTION

The present invention relates to an automatic lift valve for a container containing a pressurized creamy or liquid product, comprising a valve body comprising a cylindrical chamber provided at one of its ends with an outlet aperture, a valve seal closing, in the position of rest, said outlet aperture and being solidly fixed to a piston rod which itself is solidly fixed to a piston fitted with a ring and capable of moving in a bore, a spring working in compression between said piston and the other end of said chamber and so maintaining the valve seal against the outlet aperture, the space of the chamber containing the spring communicating with the exterior.

PRIOR ART

Lift valves of this type are described in international patent application WO 86/04,163. In these prior lift valves, the fluid passes through a longitudinal groove made in the wall of the bore, under the O-ring gasket forming the ring of the piston. According to one embodiment, the lift valve comprises two pistons fitted with piston rings, which requires a relatively long precision bore which is difficult to produce, particularly when the lift valve is made from injection-molded synthetic material. According to another embodiment comprising only one piston provided with a piston ring, and consequently able to operate with a short bore, the chamber is formed by a plurality of parts. Moreover, the groove, situated at the bottom of the bore, requires special means in order to obtain it.

SUMMARY OF THE INVENTION

The object of the present invention is to produce an automatic lift valve of simpler design which is consequently easier to manufacture and less expensive.

The automatic lift valve according to the invention comprises a cross-section reducer ring which is solidly fixed to the piston rod, between the piston and the valve seal, and a lateral inlet aperture situated between the piston and the cross-section reducer ring, close to the cross-section reducer ring, in a manner such that said ring can at least partially cover the inlet aperture during the movement of the piston toward the spring under the action of the pressurized product.

The cross-section reducer ring may be formed by a cylindrical bearing surface pierced by holes parallel to the axis. The cross-section reducer ring must be able to move freely in the chamber and does not require to be adjusted in the manner of a piston. Only the part of the cylindrical chamber in which the piston, provided with the piston ring, moves has to be produced in a perfectly smooth precision manner.

The cross-section reducer ring may be formed, for example, by a cylindrical bearing surface of the piston rod pierced by holes parallel to the axis. When the pressurized creamy or liquid product arrives in the chamber, between the piston and the cross-section reducer ring, it exercises an equal pressure on the piston and on the reducer ring but, since part of the product can pass through the cross-section reducer ring, the pressure on the reducer ring immediately drops and the piston retracts, thus opening the lift valve.

Operating without a resilient seal for the passage of the product, the lift valve according to the invention is particularly well suited to the distribution of liquid products of a certain viscosity, and creamy products.

BRIEF DESCRIPTION OF THE DRAWINGS

The attached drawing shows, by way of example, an embodiment of the invention and several variations thereof.

DESCRIPTION OF THE PREFERRED EMBODIMENTS

Figure 1:
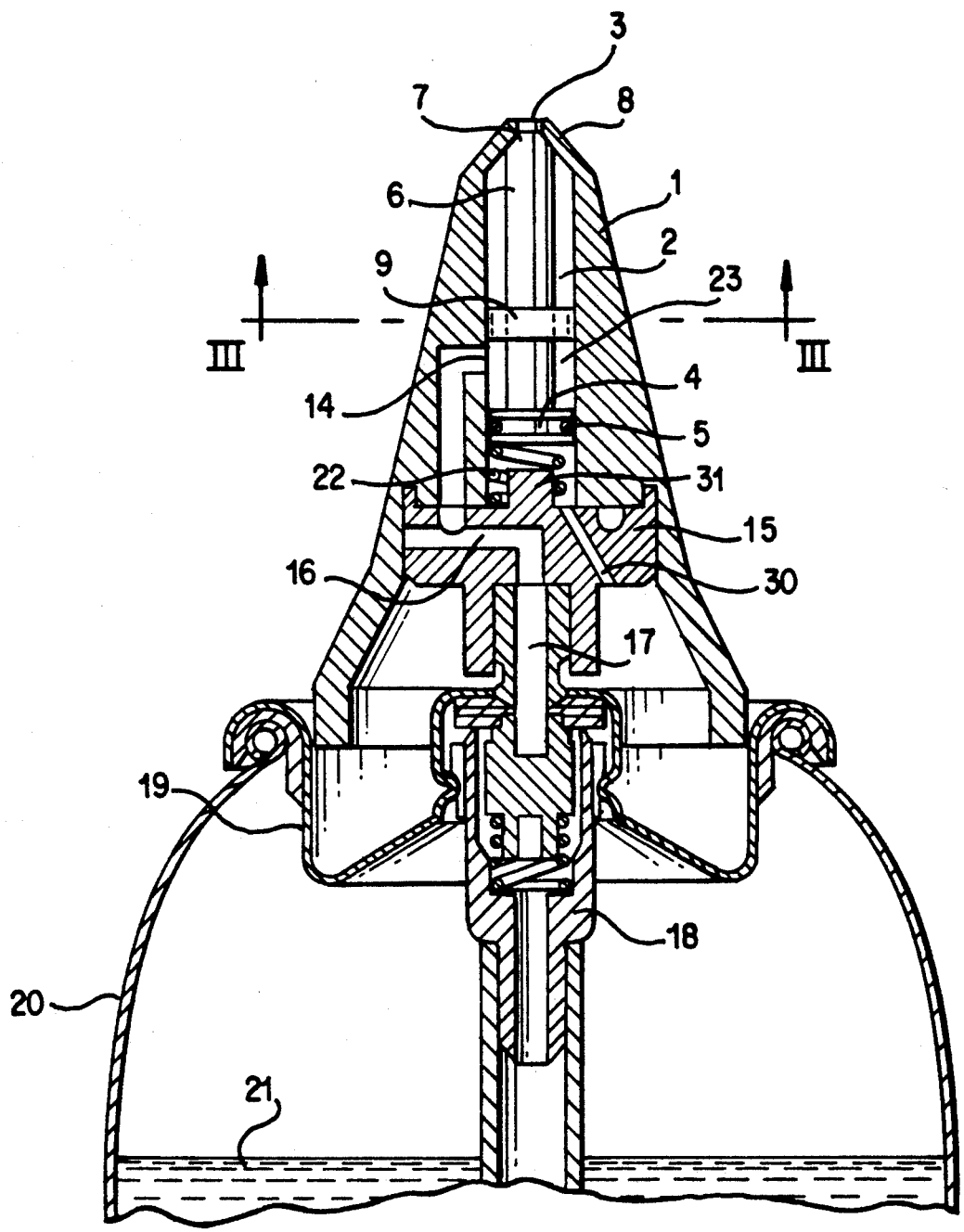
FIG. 1 is a view in axial section, in the position of rest, of an automatic lift valve according to the invention fitted to a container containing a pressurized product.
Figure 2:
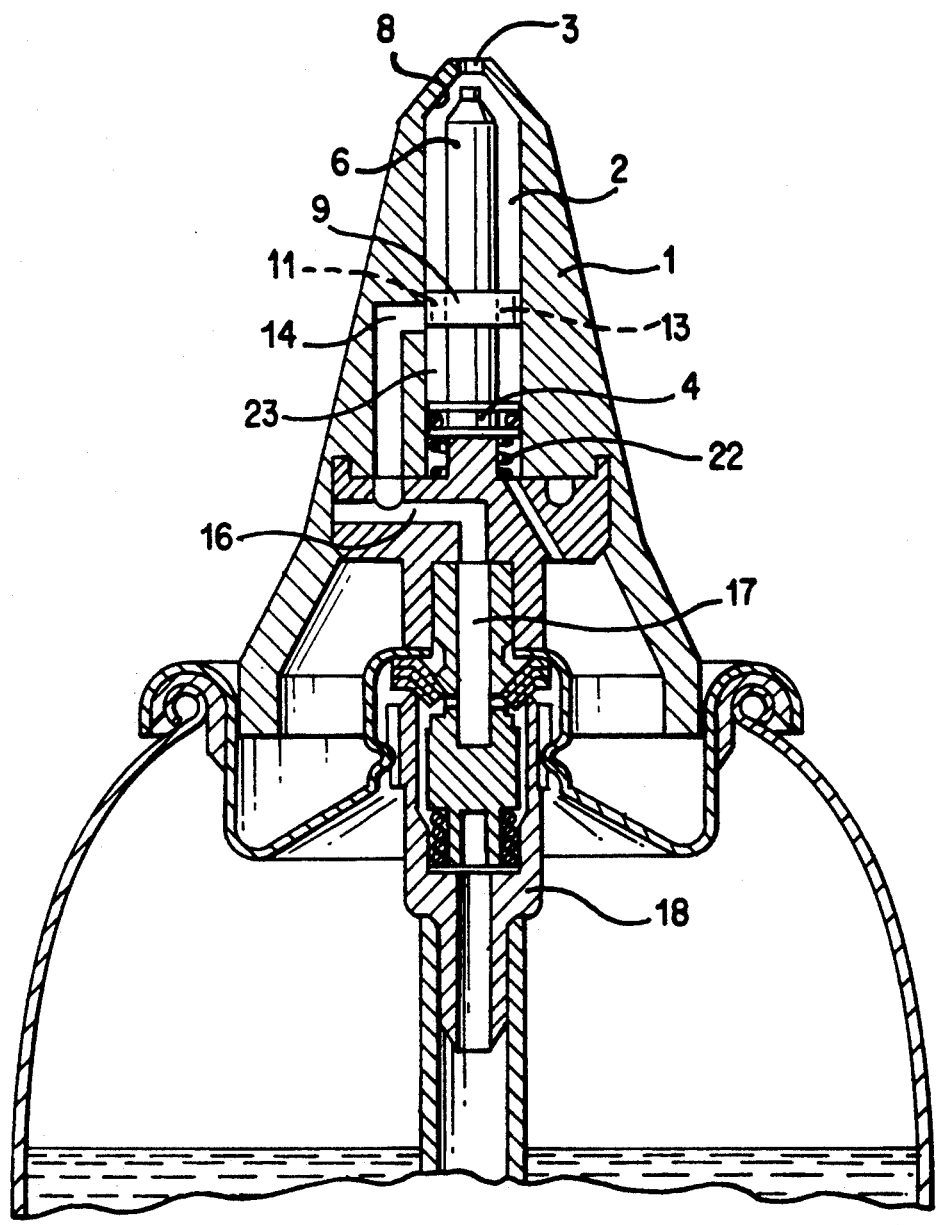
FIG. 2 is an analogous section showing the lift valve in the opening position
Figure 3:
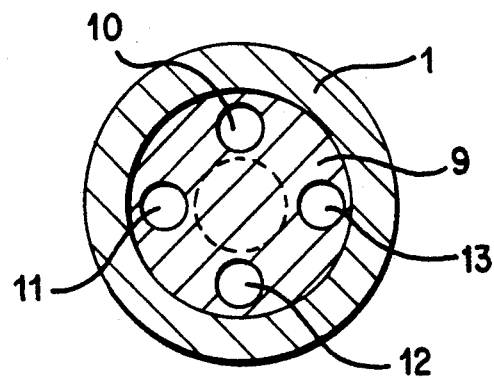
FIG. 3 is a sectional view along III—III in FIG. 1.

The automatic lift valve shown in FIG. 1 comprises a body 1 of generally conical exterior shape, containing a cylindrical chamber 2 having an outlet aperture 3 at its upper end. In this chamber 2, whose lower part possesses a precision bore, is fitted a piston 4 provided with a piston ring constituted by an O-ring gasket 5. This piston 4 is solidly fixed to a piston rod 6 whose conical end 7 forms a valve head interacting with a conical valve seat 8 to close the lift valve. The piston rod 6 further possesses a cylindrical annular bearing surface 9 pierced by holes 10, 11, 12 and 13 parallel to the axis (FIG. 3). This cylindrical bearing surface 9, with its holes, forms a cross-section reducer for the passage of the product to be distributed by the automatic lift valve. The bearing surface 9 is situated at some distance from the piston 4, and the chamber 2 possesses a lateral inlet aperture 14 situated, in the position of rest of the lift valve, between the piston 4 and the bearing surface 9, close to this bearing surface 9. The chamber 2 is closed, in its lower part, by a closing piece 15 pierced by a duct 16 which establishes communication between the inlet aperture of the lift valve and the axial passage 17 of a valve 18 on which the automatic lift valve is fitted. The valve 18 is of a known design and will not be described in detail. It is fixed, in a known manner, in a collar 19 which is itself fixed on a container 20 containing a pressurized creamy or liquid product 21. A spring 22, working in compression, is mounted between the piston 4 and the closing piece 15. This spring 22 maintains the rod 6 in the closed position.

The part of the chamber 2 containing the spring 22 communicates with the exterior by a duct 30, in a manner such that the pressure in this part of the chamber is always equal to atmospheric pressure. The retraction of the piston 4 is limited by a stop 31 formed by a cylindrical projection of the closing piece 15. This stop 31 thus likewise has the effect of limiting the retraction of the cylindrical bearing surface 9 in a manner such that the aperture 14 does not open beyond this bearing surface 9.

When the automatic lift valve is brought into communication with the pressurized product, which in the example in question results from a pressure being exerted on the valve stem of the valve 18 by means of the body 1 of the lift valve, the pressurized product penetrates into the chamber 2 between the piston 4 and the cylindrical bearing surface 9. Some of the liquid passes through the holes 10 to 13 in a manner such that the thrust exerted on the bearing surface 9 is less than the thrust exerted on the piston 4. The difference between the forces acting on the bearing surface 9 on the one hand, and on the piston 4 on the other hand, results in the thrusting back of the piston 4, compressing the spring 22, which causes the opening of the lift valve, the product then being able to flow through the aperture 3. The cylindrical bearing surface 9, retracting with the piston 4, eventually comes to obstruct the aperture 14 more or less completely, which results in a pressure drop in the part 23 of the chamber 2 between the piston 4 and the cylindrical bearing surface 9. The spring 22, correctly calibrated, can then thrust back the piston 4 and consequently the cylindrical bearing surface 9, the effect of which is to reopen the aperture 14. A more or less stable equilibrium is established between the force exerted on the piston 4 by the product and the force of the spring 22, which equilibrium corresponds to a reduction of the pressure beyond the cylindrical bearing surface 9. The automatic lift valve thus functions equally as a pressure release valve and a flow regulator.

Figure 4:
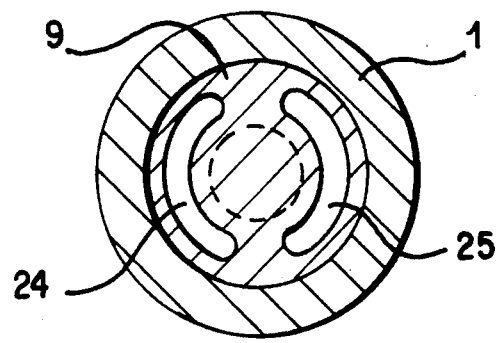
FIG. 4 is a first variation of this section.
Figure 5:
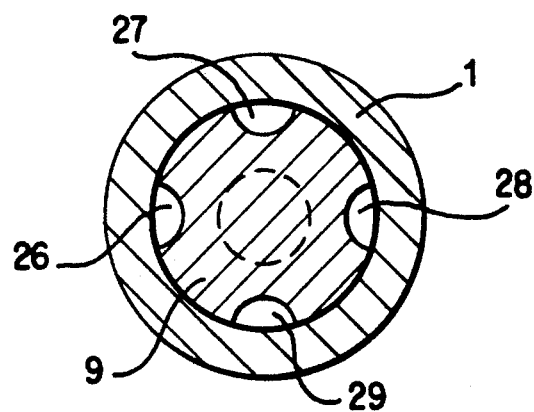
FIG. 5 is a second variation of this section.

The cross-section reducer ring may have a different configuration from that shown. FIGS. 4 and 5 show, by way of example, two alternative embodiments. According to FIG. 4, the cylindrical holes 10 to 13 in FIG. 3 are replaced by two holes 24 and 25 of arcuate shape. In the variation according to FIG. 5, the holes are replaced by four axial grooves 26, 27, 28 and 29. In this case, the piston rod 6 has to be angularly positioned in order for the aperture 14 always to between two grooves. Such a positioning can be obtained, for example, by giving a pyramidal shape to the end of the piston rod 6 and to the piston seat 8.

The head of the lift valve can, of course, be produced in numerous ways. It may, in particular, be constituted by a piece attached to the end of the piston rod 6, this attached piece, made from resilient material, being applied to the hole 3 in order to seal it.

The automatic lift valve according to the invention can, of course, be used with any pressurized product source comprising a principal lift valve.

The lift valve according to the invention may be produced wholly or partially from metal or from a synthetic material.

The valve according to the invention requires no delicate adjustment and functions in a completely reliable manner.

I claim:

1. An automatic lift valve for a container containing a pressurized creamy or liquid product, comprising a valve body (1) comprising a cylindrical chamber (2) provided with at one of its ends with an outlet aperture (3), a valve seal (7) closing, in the position of rest, said outlet aperture and being solidly fixed to a piston rod (6) which itself is solidly fixed to a piston (4) fitted with a ring (5) and capable of moving in a bore, a spring (22) working in compression between said piston and the other end of said chamber and so maintaining the valve seal (7) against the outlet aperture, the space of the chamber containing the spring communicating with the exterior (30), which piston rid (6) comprises a cross-section reducer ring (9) which is solidly fixed to the piston rod (6), between the piston (4) and the valve seal (7), and a lateral inlet aperture (14) situated between the piston and the cross-section reducer ring, close to the cross-section reducer ring, in a manner such that said ring can at least partially cover the inlet aperture (14) during the movement of the piston toward the spring.

2. The lift valve as claimed in claim 1, wherein the cross-section reducer ring is constituted by a cylindrical annular bearing surface (9) of the piston rod (6), this cylindrical bearing surface being pierced by holes (10 to 13; 24, 25).

3. The lift valve as claimed in claim 1, wherein the cross-section reducer ring is constituted by a cylindrical bearing surface (9) provided with grooves or notches (26 to 29).

4. The lift valve as claimed in claim 1 wherein a lift valve head is constituted by a part attached to the end of the piston rod.

* * * * *